Nov. 18, 1930. F. L. BARBER ET AL 1,782,130
LATERAL MOTION ROLLER BEARING FOR CARS
Filed Feb. 15, 1929 2 Sheets-Sheet 1
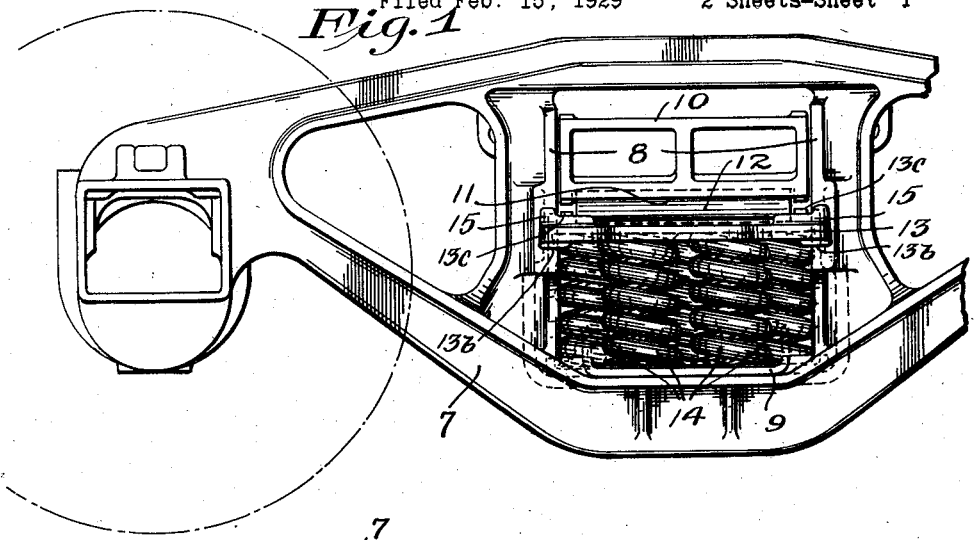

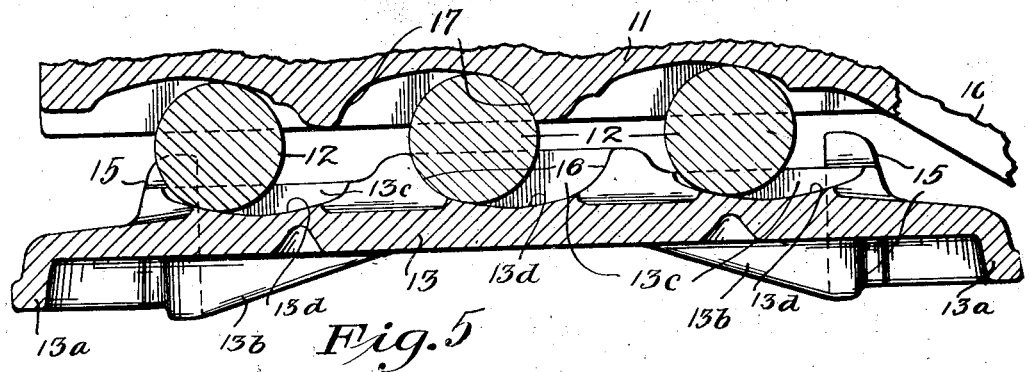
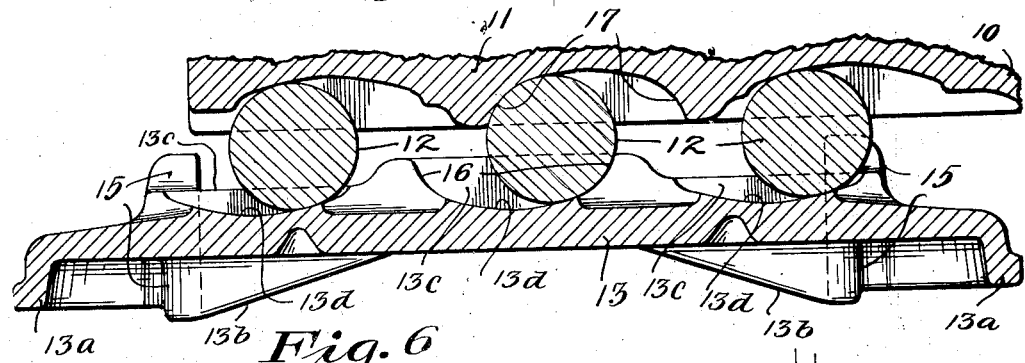
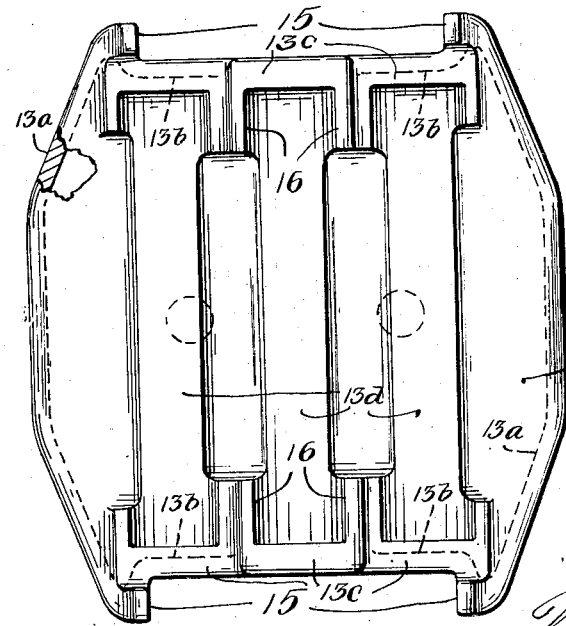
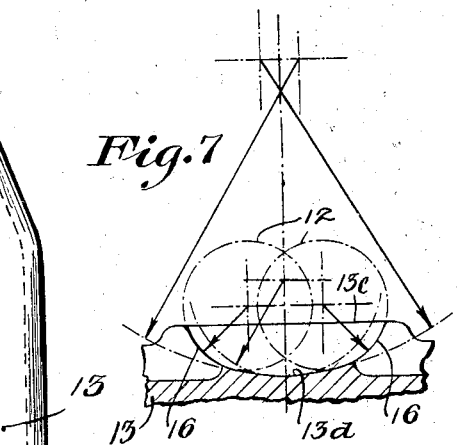

Patented Nov. 18, 1930

1,782,130

UNITED STATES PATENT OFFICE

FRANKLIN L. BARBER AND EDWIN W. WEBB, OF CHICAGO, ILLINOIS, ASSIGNORS TO STANDARD CAR TRUCK COMPANY, OF CHICAGO, ILLINOIS, A CORPORATION OF NEW JERSEY

LATERAL-MOTION ROLLER BEARING FOR CARS

Application filed February 15, 1929. Serial No. 340,240.

Our invention relates to lateral motion roller bearing devices, for car trucks, of the types disclosed in numerous prior patents, including those hereinbelow identified, which will be sufficient for purposes of illustration, namely:—

383,688, J. C. Barber, May 29th, 1888; 565,421, J. C. Barber, Aug. 11th, 1896.—In these two J. C. Barber patents, the lower member of the two roller bearing plates serves as a spring cap and has freedom for vertical motion with the springs while being guided by the columns and held thereby from any lateral travel, while the upper member of said bearing plates is carried by the truck bolster and travels laterally with the rollers.

573,636, J. C. Barber, Dec. 22nd, 1896.—In this patent, the lower roller bearing plate is held fixed against any movement whatever, while the upper plate rests on the rollers and supports the springs which in turn support the bolster and travels laterally with the bolster. In other words, the upper plate and the springs and the bolster all travel together.

588,810, J. C. Barber, Aug. 24th, 1897.—In this case, the roller bearing plates are at the center of the car truck and car body with the lower plate fixed to the truck transom and the upper roller bearing plate so constructed as to serve as the lower member of the center plates and is free to travel laterally on the rollers.

708,855, J. C. Barber, Sept. 9th, 1902.—In this case, the lower roller bearing plates is afforded by the top plate of the journal box and the upper plate has a vertical projection which telescopes with a downward projection carried by the side frame and surrounded by the coiled spring which sustains the side frame. The side frames and the said parts just noted for causing the upper roller bearing plate to travel laterally with the side frames on the rollers is supported by the journal boxes.

798,350, Lake & Deverell, Aug. 29th, 1905.—In this case, the load of the car is carried by side bearings which rest on the upper or traveling member of the lateral motion roller bearing devices and travels with the rollers which rest on the lower bearing plate fixed to the truck transom.

863,012, J. C. Barber, Aug. 13th, 1907.—In this case, as in the Lake & Deverell, the load on the car is carried on the side bearings, which rest on the upper roller bearing plates, but the lower roller bearing plates are fixed to the truck bolster which is supported by springs resting on the lower members of the side frames.

Our invention has for its object to afford an improvement for limiting the lateral travel of the traveling rollers and the traveling roller bearing plates in all the types of lateral motion roller bearings illustrated in the patents above identified; and, to this end, our invention consists of the novel devices and combinations of devices hereinafter described and pointed out in the claims.

Our invention, in its preferred form, is illustrated in the accompanying drawings. Therein like notations referring to like parts, throughout the several views.

Fig. 1 is a view chiefly in end elevation, but with some parts broken away and others in diagram, showing one of the side frames of a car truck having our improved lateral motion roller bearing devices in working position thereon.

Fig. 2 is a view chiefly in vertical section, crosswise of the truck, but partly in elevation, for better illustrating the parts shown in Fig. 1.

Fig. 3 is a view of the parts shown in Fig. 2 chiefly in horizontal section, but partly in plan.

Fig. 4 is a transverse vertical section of our improved lateral motion roller bearing device, on a much larger scale than in the before named views, with the rollers shown at the limits of their left hand lateral travel.

Fig. 5 is a view of the same kind but showing the rollers at the limits of their right hand travel.

Fig. 6 is a plan view of the lower or non-traveling roller bearing plate detached, and Fig. 7 is a diagram, illustrating contour of roller treads and stop surfaces.

The numeral 7 represents one of the side frames of the integral pressed steel or cast metal type; and the numerals 8 represent the bolster columns of this side frame. The numeral 9 represents the central transom of the truck frame, and the numeral 10 represents the truck bolster. Said truck bolster 10 is so formed, on its under end portions, as to afford the traveling members 11 of the lateral motion roller bearing device, used at each end for supporting the bolster and taking the load from the car (not shown). The numerals 12 represent the rollers, which in the sets shown, are three. The numeral 13 represents the lower or non-traveling member of the roller bearing plates. In this instance, this lower roller bearing plate 13 serves also as a spring cap which rests on the group of underlying springs 14 which in turn are supported upon the end portions of the underlying transom 9. The said non-traveling or lower roller bearing plate 13 is provided with strong projecting lugs 15 properly spaced to embrace and snugly fit the bolster columns 8; and in virtue of these features and their relations to said columns, the said lower bearing plate 13 is free to rise and fall with the springs but cannot travel laterally with the bolster and the rollers.

More or less of the parts, in fact most of the parts, so far detailed, are old. The features of novelty will next be specified.

The present practice, in railroading, is to employ freight cars of very large capacity, such as 80 or 100 tons or even more. Hitherto, in the useage of what has come to be known in the trade as the Barber lateral motion roller bearing devices, it has been the custom to provide strong stops projecting up from the faces of the truck bolsters, in proper positions inward of the side frames of the truck, to strike the upper portions of the side frames to limit the lateral travel of the truck bolster, its supporting rollers and that of the car carried by the truck bolster, with its heavy load. In view of these facts, it can readily be understood that the jars or shocks imparted to the side frames of the truck by these bolster carried stops, or their equivalents is very great.

Our invention has for its purpose to overcome this defect. To this end, we provide sets of cooperating stops marked respectively 16 and 17, one set on each of the two bearing plates, and which sets of stops have their stopping surfaces of such contour as to fit the contour of the periphery of the particular roller that strikes the same, under the lateral traveling motion of the three rollers and the truck bolster. As shown, we provide these sets of stops 16 and 17 only for the central member of said three rollers 12. The stop members 16 are located on the lower bearing plate 13 and the stop members 17 are located on the upper bearing plate 11, which is a part of the bolster 10. These features and their relations to the central member of said rollers 12 are best shown in Figs. 4 and 5. Taking directions from an observer looking at these views, or at Figs. 2 and 3, it may, then, be said that in Fig. 4 the rollers and the bolster are shown at the left hand limit of the traveling motion of said parts; and that in Fig. 5 the rollers and the bolster are shown at the right hand limits of their lateral traveling motion. In virtue of the stated contours of the stopping surfaces of said stops 16 and 17, being such as to conform to the periphery of the roller, it follows that the stopping action is a gradual one and is taken on a large area of cooperating surfaces. In other words, the jar is largely eliminated. It is literally true to say that it is minimized.

Of course, in a three roller set, the cooperating stops 16 and 17 might be applied to any one of the other rollers, but not quite equally well, as the stopping strength is better distributed when said stops are applied to the central roller. In such sets of three or more rollers there is another advantage in having the said cooperating stops 16 and 17 applied to only one of the rollers, to wit; the necessity for synchronizing the stopping action of all the rollers of a set is eliminated. In sets, however, that employ only two rollers, the cooperating stops could be applied to either one of the two rollers or to both of them; and if four rollers were employed, the stops might be applied to either or both of the central rollers.

It should be noted that the stopping surfaces of said cooperating stops 16 and 17 are continuous with the roller treads of said plates but formed on sharper curves having the center of the roller as their radii, while the treads for the rollers, in the plates, approximate opposite inclines meeting on a curve, at their said central portions, described by a radius longer than the radius of one of the rollers, as shown in Fig. 7. These details are of importance, for securing the best tread surfaces for all the rollers and the best stopping surfaces for the particular roller or rollers to which the stops are applied.

By reference to Figs. 1, 2 and 3, it will be seen that the springs 14 are seven in number and are so nested that they occupy three rows, running lengthwise of the truck, with three springs in the central row and two springs in each of the other two rows. Incidental to this nesting, it follows that the end springs of the central row closely abut the bolster columns 8 while the other two rows of springs stand a short distance away from the said columns.

It has already been noted that the lower roller bearing plate 13 serves also as a spring cap to the rollers 14; and attention will now be called to some details of the structure of this plate 13. Said plate is provided with downwardly extending side flanges 13ª which extend to the opposite members of the bolster-engaging lugs 15, thereby greatly adding to the strength of the plate as a whole and particularly to the strength of said lugs 15. Then, these side flanges 13ª are also connected with cross flanges 13ᵇ, on the under surface of the plate, located directly underneath the end walls 13ᶜ of the roller seats 13ᵈ. The said walls 13ᶜ are raised above the body of the plate 13 and the particular end walls of the central roller seat are raised higher than the end walls of the seats for the other two rollers and they merge into the roller stop 16, as best shown in Figs. 4 and 5, thereby greatly strengthening the said stops 16. The said flanges 13ᵇ do not extend clear across the body of the plate 13, but are inclined upward and merge into the body of the plate, outward of the cross center thereof, as clearly shown in Fig. 5 of the drawings. They could not run clear across, because of the presence of the upper ends of the end members of the central row of springs, as can be readily understood from an inspection of Figs. 1 and 3 of the drawings. The presence of these cross flanges 13ᵇ, located as above stated, greatly strengthens the plates 13 at the places where great strength is needed to withstand the shocks from the stopping action of the rollers.

The fact that the bolster column-embracing lugs 15 project from the plate 13, at the points where the said plates are reenforced, both by the downwardly extending side flanges 13ª and the cross flanges 13ᵇ, makes these lugs 15 have the great strength needed to withstand the stopping action when the force thereof is transmitted by the said lugs 15 to the bolster columns 8.

It will, of course, be understood that the lower or non-traveling member 13 of said roller bearing plates, instead of having the lugs 15 adapted to embrace the bolster columns 8, might be provided with single strong projecting lugs which would engage with channels in the bolster columns for serving the same purposes to prevent the lateral travel of that plate 13, while leaving the same free to rise and fall with the springs 14, while being guided by the bolster columns.

What is claimed is:

1. A lateral motion roller bearing device for car trucks and cars, which device comprises a set of several rollers and a pair of bearing plates, one below the rollers and the other above and resting on the rollers, and which plates have cooperating stops applicable to only one of the said set of several rollers, substantially as described and for the purpose stated.

2. In a lateral motion roller bearing device, for car trucks and cars, the combination with the rollers of a lower and an upper bearing plate, one of which two plates is held against lateral travel and the other of which if free for lateral travel with the rollers and the car body, roller stops on the relatively fixed or non-traveling member of said two plates operative to limit the lateral travel of said rollers and the traveling member of said two plates, and which non-traveling member is strongly reinforced in the portions thereof which carry said stops substantially as described.

3. In a car truck, the combination with side frames, of a truck bolster having, on its under end portions, the upper members of lateral motion roller bearing plates, lower roller bearing plates having lugs which engage with the bolster columns of said frame to prevent lateral motion thereof, lateral motion rollers between said two plates, cooperating stops on said two plates, for limiting the lateral travel of said rollers and bolster and which lower or non-traveling member of said bearing plates is provided with downwardly extending side flanges which merge into its bolster column engaging lugs and is also provided, on its under surface, with cross flanges, directly below the raised end walls of the roller seats on the face of said plate, and which cross flanges merge into the body of said plate outward of the cross center thereof and coincident with the raised roller stops of said plate, substantially as described and for the purposes set forth.

In testimony whereof we affix our signatures.

FRANKLIN L. BARBER.
EDWIN W. WEBB.